Dec. 24, 1940.  E. P. MERTES ET AL  2,225,752

GRAINING MACHINE

Filed May 24, 1939    4 Sheets-Sheet 1

INVENTORS
EDWIN P. MERTES
JESSE J. KELLOGG
EDWARD E. FICKENWIRTH

BY
ATTORNEY

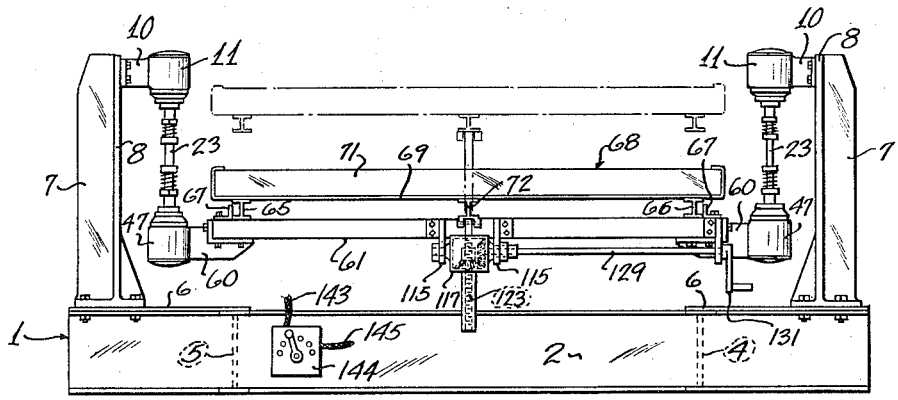

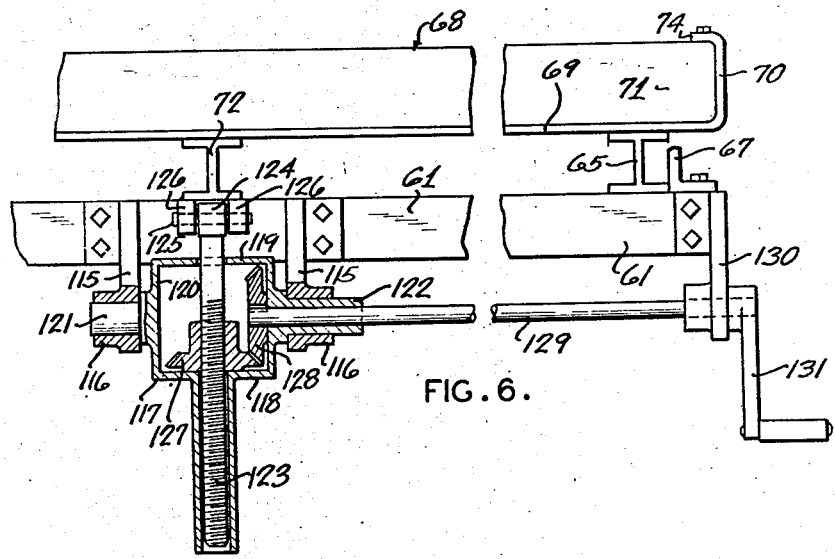
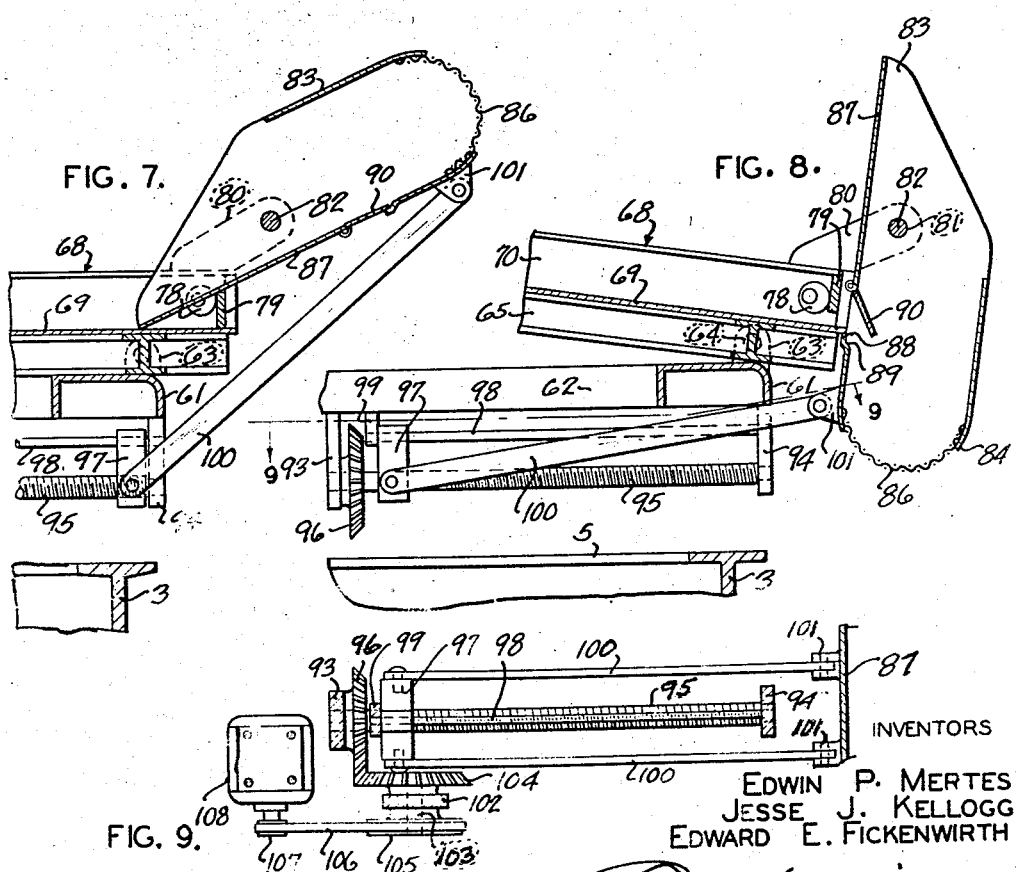

Dec. 24, 1940.  E. P. MERTES ET AL  2,225,752
GRAINING MACHINE
Filed May 24, 1939   4 Sheets-Sheet 4
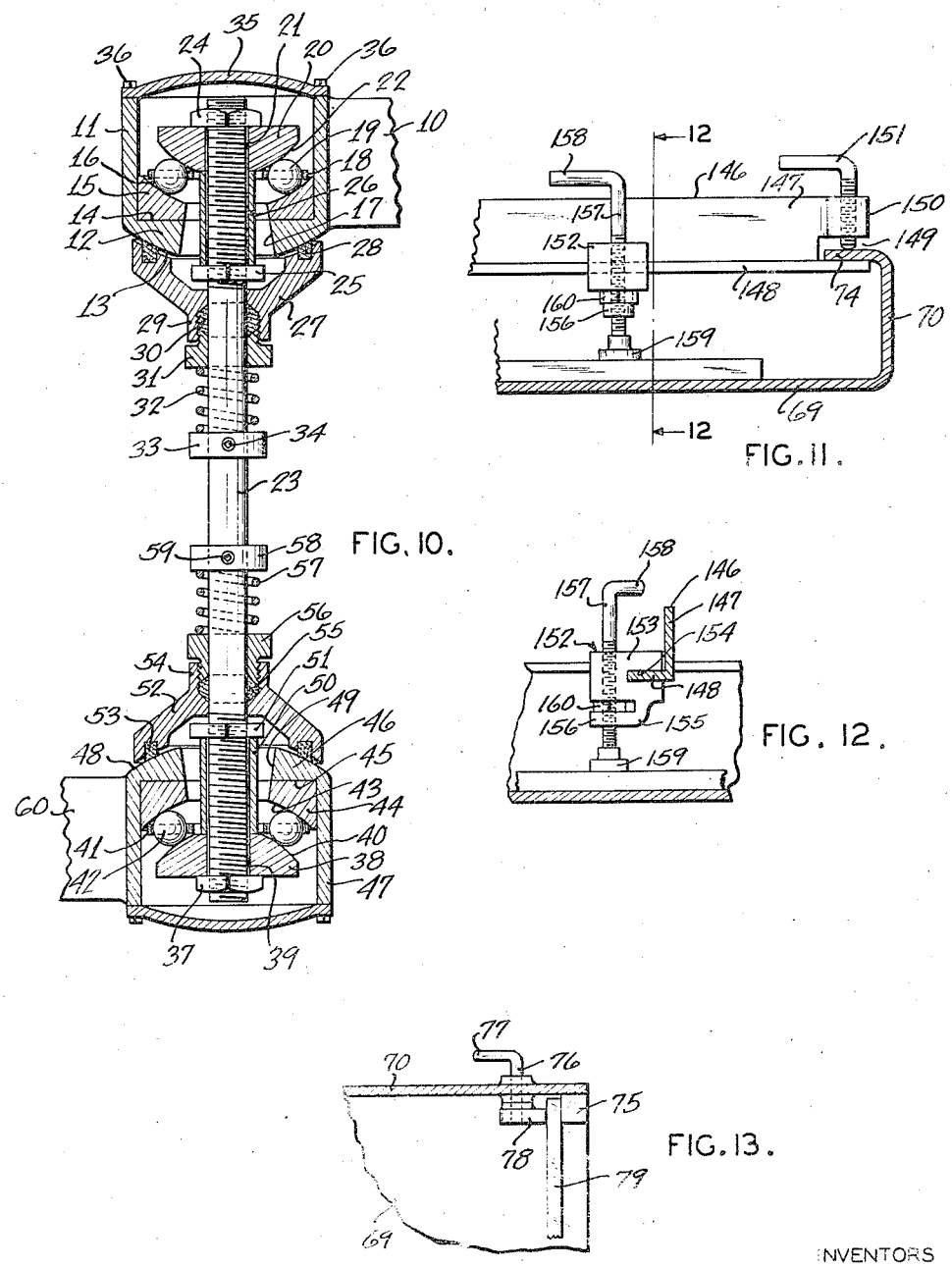
INVENTORS
EDWIN P. MERTES
JESSE J. KELLOGG
EDWARD E. FICKENWIRTH
BY
ATTORNEY Patented Dec. 24, 1940

2,225,752

UNITED STATES PATENT OFFICE 2,225,752

GRAINING MACHINE

Edwin P. Mertes, Jesse J. Kellogg, and Edward E. Fickenwirth, St. Louis, Mo.; said Mertes and said Kellogg assignors to said Fickenwirth Application May 24, 1939, Serial No. 275,428

18 Claims. (Cl. 51—6)

This invention relates to a certain new and useful improvement in graining machines and has for its primary objects the provision of a graining machine, which may be readily and inexpensively constructed, which requires a minimum of labor and is economical in costs of operation and maintenance, which is rugged and durable, and which is efficient in the performance of its intended functions.

And with the above and other objects in view, our invention resides in the novel features of form, construction, arrangement, and combination of parts presently described and pointed out in the claims.

In the accompanying drawings (4 sheets)—

Figure 3 is a front elevational view of the machine;

Figure 1:
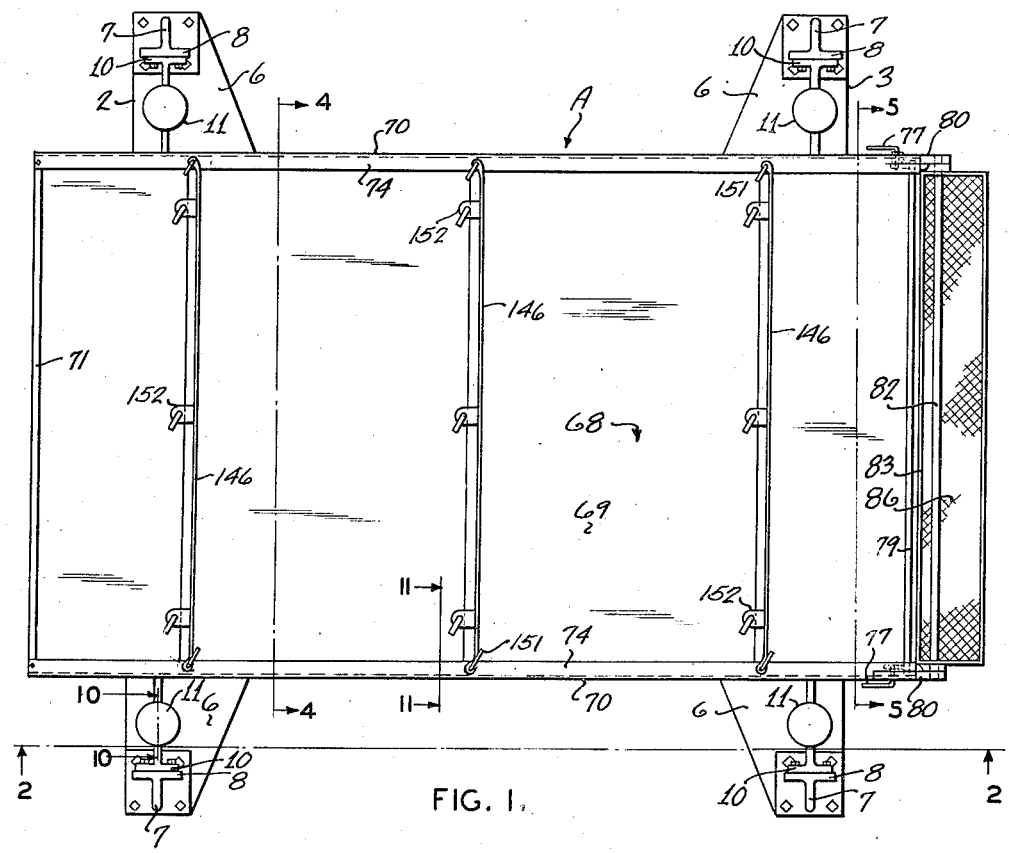
Figure 1 is a top plan view of a graining machine constructed in accordance with and embodying our invention.
Figure 2:
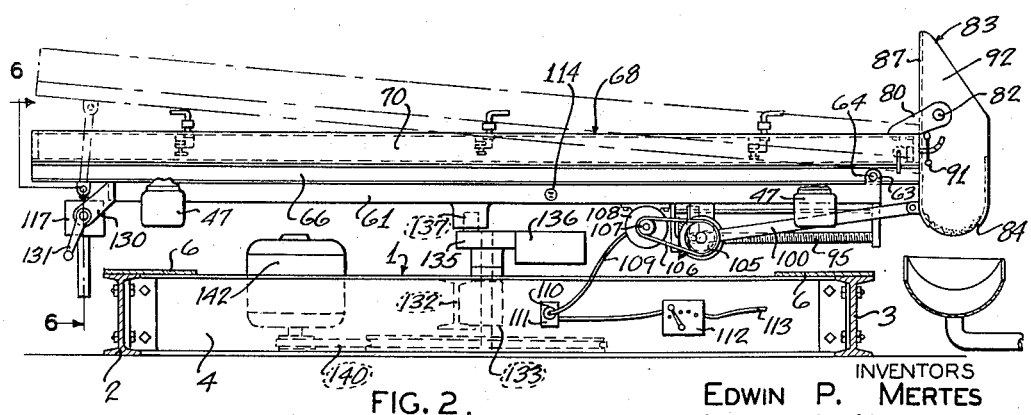
Figure 2 is a longitudinal sectional view of the machine, taken approximately along the line 2—2, Figure 1.

Figures 4 and 5 are transverse sectional views of the machine, taken approximately along the lines 4—4 and 5—5, respectively, of Figure 1;

Figure 6 is a fragmentary sectional view of the graining pan elevator mechanism of the machine, taken approximately along the line 6—6, Figure 2;

Figures 7 and 8 are fragmentary sectional views of the ball-trough of the machine in upright and tilted positions, respectively;

Figure 9 is a horizontal sectional view of the ball-trough tilting mechanism of the machine, taken approximately along the line 9—9, Figure 8;

Figure 10 is a vertical sectional view of the swinging bearing members of the machine, taken approximately along the line 10—10, Figure 1;

Figure 11 is a fragmentary sectional view of the machine, taken approximately along the line 11—11, Figure 1, illustrating in detail the work clamping structure of the machine;

Figure 12 is a fragmentary sectional view of the work clamping structure of the machine, taken approximately along the line 12—12, Figure 11; and Figure 13 is a fragmentary sectional view of the machine, illustrating in detail the gate-locking mechanism thereof.

Referring now in more detail and by reference characters to the drawings, which illustrate a preferred embodiment of our present invention, the graining machine A includes a base or bed 1 comprising a pair of spaced parallel cross beams 2, 3, transversely connected by a pair of spaced parallel longitudinal beams 4, 5, and welded or otherwise fixed upon the upper face of the beam members 2, 3, 4, 5, at the corners of the bed 1, are triangular brace-plates 6 for imparting greater rigidity and stability to the bed 1.

Bolted or otherwise secured upon the upwardly presented face of each of the plates 6 in alignment with the outer extremities of the cross beams 2, 3, are four substantially rigid columns or pedestals 7 preferably of T-shape cross section having cross flanges 8 presented laterally parallel to the longitudinal axis of the machine bed 1.

Secured, as by bolts or other suitable attaching means upon the inner face of each column flange 8 adjacent the upper extremity of the column 7, is an inwardly extending horizontally disposed bracket 10 preferably integrally provided at its inner extremity with a cylindrical bearing housing 11, as best seen in Figures 3 and 10 and for purposes presently more fully appearing.

The bearing housing 11 at its lower extremity includes an inwardly extending annular flange 12 having a downwardly presented curved outer face 13 and an upwardly presented flat inner face 14 for supporting an annular bearing ring 15 having an upwardly presented wearing surface or race 16. The housing flange 12 and the bearing ring 15 are centrally bored in the provision of a preferably frusto-conical aperture or clearance space 17, and operatively mounted in a retainer ring 18 for anti-friction movement upon the race 16, is a plurality of ball bearings 19 supporting a hanger collar 20 having a central aperture 21 and a downwardly presented curved bearing face 22.

Slidably mounted in, and extending downwardly through, the collar aperture 21, is a supporting rod 23 threaded for a substantial distance at and adjacent its upper end for accommodating a pair of opposed adjustment nuts 24, 25, and a bushing 26, the latter being positioned between the upper face of the nut 25 and the under face 22 of the hanger collar 20 and extending beyond the lower margin of the frustro-conical aperture 17 of the housing 11 for facilitating access to the nut 25. It will, of course, be evident that the nut 25 may be loosened and the nut 24 simultaneously tightened to adjust the rod 23 upwardly with respect to the hanger collar 20. Conversely, if it is desired to adjust the rod 23 downwardly with respect to the hanger collar 20, the nut 24 may be loosened and the nut 25 tightened.

In either case, when the desired point of adjustment is reached, the nuts 24, 25, are relatively tightened so as to securely suspend the rod 23 within and from the hanger collar 20.

Slidably mounted upon the rod 23 below the nut 25, is a sealing cup 27 equipped in its rim with an upwardly projecting ring 28 formed of cork, felt, or other suitable material for wiping contact along its upper face with the downwardly presented outer face 13 of the housing 11, thereby excluding dirt and grit from the bearing and, at the same time, being retractible to allow ready access to the nuts 24 during adjustment.

Centrally the sealing cup 27 is provided with a downwardly presented sleeve or hub-portion 29 counter-bored and internally threaded for accommodating a packing-ring 30 and a packing nut 31, which latter, on its downwardly presented end face, abuttingly engages the upper end of a compression spring 32 supported by a set-collar 33 secured on the rod 23 by a socket-headed set screw 34. At its upwardly presented end, the housing 11 is provided with a removable cap plate 35 conventionally held in position by a plurality of short stud screws 36.

The rod 23 is also threaded for a substantial distance at its other or lower extremity for accommodating an adjustment nut 37 for supporting a hanger-collar 38 having a central aperture 39 and an upwardly presented bearing surface 40 of suitable rounded contour. Operably mounted in a retainer ring 41 and resting upon the bearing surface 40 of the hanger collar 38, is a plurality of ball bearings 42 disposed in a preferably spherical race or wearing surface 43 of an annular bearing ring 44 mounted snugly within, and against the horizontal under face 45 of the apertured end wall or flange 46 of, a bearing housing 47, the flange 46 being, in turn, provided with an upwardly presented face 48 also preferably of suitable rounded contour.

The housing flange or wall 46 and the bearing ring 44 are centrally bored in the provision of a preferably frustro-conical clearance aperture 49 for permitting free-swinging movement of the rod 23.

Shiftably mounted around the lower threaded end of the rod 23 and extending through the clearance aperture 49, is a sleeve 50 held at its upper end by an adjustment nut 51 threadedly mounted on the lower threaded end of the rod 23. Also shiftably mounted on the rod 23 above the adjustment nut 51, is a sealing cup 52 provided in its rim with a downwardly projecting annular sealing ring 53 formed of cork, felt, or other suitable material and having wiping contact with the upwardly presented spherical face 48 of the housing flange 46. At its upper end, the sealing cup 52 is provided with an upwardly extending hub-portion 54 counter-bored and internally threaded for accommodating a packing ring 55 and packing nut 56, which latter, at its upper end, abuttingly engages the lower end of a compression spring 57, in turn, at its upper end impinging against a set collar 58 secured on the rod 23 by a socket-headed set screw 59.

Formed preferably integrally with, and extending inwardly from, the respective bearing housings 47 at right angles to the longitudinal axis of the machine bed 1, are frame brackets 60, and bolted or otherwise rigidly secured at its corners in the frame brackets 60, is a rectangular frame 61 having a central longitudinally extending beam 62. In order to "level" or adjust the frame 61 for grinding operation in a truly horizontal plane, the rods 23 may be drawn up or extended between the housings 11, as above described.

Mounted flatwise upon the upper face of the frame 61 adjacent the rear corners thereof, respectively, is a pair of opposed upstanding ears or the like 63, pivotally secured to which by pins 64, are parallel spaced rails 65, 66, preferably of I-section, which normally extend longitudinally along the frame 61.

Welded or otherwise fixed upon the upper face of the frame 61 in proximity to the forward corners thereof for engagement with the outwardly presented side margins of the rails 65, 66, respectively, for preventing any side sway or lost motion, is a pair of upwardly projecting stop brackets 67, and welded upon, and extending between, the rails 65, 66, is a graining table or trough 68 having a bottom 69, opposed parallel side walls 70, and a fixed front wall 71. Centrally of its under face, the bottom wall 69 is provided with a reinforcing rail 72, which is of substantially the same size as the side rails 65, 66, and normally rests upon the center beam 62 of the frame 61. Since the graining panel or trough 68 must support relatively large loads, as will presently appear, we have found it preferable to introduce between the elements 65, 72, 66, a plurality of intermediate transverse strengthening or stiffening ribs 73.

Along their upper margins, the graining trough or pan side walls 70 are bent inwardly in the provision of flanges 74 and at their rearward margins are provided with vertically extending stop blocks 75. Rotatively mounted in each of the side walls 70 and spaced rearwardly from the stop blocks 75, are cam rods 76 provided on their outwardly extending ends with short operating handles 77 and on their inner ends with an eccentric disk or cam lock 78.

Shiftably mounted at its ends between the disks 78 and the stop blocks 75 and extending transversely across the rearward end of the graining pan or tray 68, is a movable rubber sheathed rear wall 79, all as best seen in Figures 7 and 8 and for purposes presently more fully appearing.

Extending upwardly and rearwardly from each of the trough side walls 70, are hopper brackets 80 provided with aligned apertures 81 for receiving a shaft 82. Swingably mounted in its side walls on, and extending around, the shaft 82, is a scoop-shaped hopper 83 having an arcuate bottom wall 84 cut away in the provision of a drain opening across which is disposed an arcuate section of heavy wire mesh, netting, or the like 86. In its forwardly presented side wall 87, the hopper 83 is provided with a slot or opening 88, which, at its lower margin 89, is deformed outwardly to underlie the rearwardly extending edge of the graining tray bottom 69. Swingably disposed along the upper margin of the slot 88, is a closure flap 90 operably connected to a manipulating handle 91 positioned on the outer face of one of the hopper side walls 92.

Mounted on the under face of the center beam 62 of the frame 61 adjacent the rear end thereof, is a pair of downwardly extending vertical hanger plates 93, 94, apertured for rotatively supporting a lead screw 95 having pinned upon its one end a beveled driving gear 96. Threadedly mounted on the lead screw 95, is a traveler block 97 apertured at its upper end for slidable disposition upon a guide rod 98, which is, in turn, supported at its one end in the hanger arm 94 and at its other end by a short intermediate hanger arm 99 mounted on the under face of the frame center beam 62 and spaced rearwardly a short distance from the hanger plate 93.

Pivotally mounted on opposite sides of, and extending rearwardly from, the block 97, is a pair of parallel links 100, in turn, at their rear ends pivotally connected to a projecting lug 101 welded or otherwise fixed on the forwardly presented face of the hopper wall 87, all as best seen in Figures 7 and 8 and for purposes presently more fully appearing.

Also welded or otherwise fixed on, and extending vertically downwardly from, the center beam 62 of the frame 61, is a hanger plate 102 apertured for rotatively accommodating a short shaft 103 extending horizontally therethrough and provided at its inner end with a beveled gear 104 having meshing engagement with the beveled gear 96. On its outwardly extending end, the shaft 103 is provided with a pulley 105, in turn, drivingly connected by a belt 106 to a driving pulley 107 of an electric motor or other prime mover 108 connected by a conventional flexible conductor 109 through a separable plug 110 and receptacle 111 to a conventional controller 112, in turn, conventionally connected through a conductor 113 to any suitable source of electrical power (not shown). At any suitable position on the side of the frame 61 may be mounted a dummy plug member 114 for receiving the separable plug 110 during actual graining operation of the graining machine A, for purposes presently more fully appearing and as best seen in Figure 2.

Mounted on the forward transverse margin of, and extending obliquely downwardly and outwardly from, the frame 61, is a pair of spaced parallel bracket arms 115 provided at their outer ends with axially aligned bearing collars 116. Disposed between the brackets 115, is a cylindrical housing 117 having centrally apertured top and bottom walls 118, 119, and a side wall 120 provided with a stub shaft 121 and a diametrally opposed axially bored tubular shaft or quill 122, respectively, journaled in the opposed bearing collars 116 of the brackets 115. Extending freely through the apertures of the top and bottom housing-walls 118, 119, is an elevator screw 123 provided at its upwardly extended end with an enlarged eye 124 for rotatively receiving a pivot pin 125 mounted in and extending through a pair of opposed yoke-forming bearing lugs 126 welded or otherwise fixed on the under face of the graining tray center rail 72 adjacent its forward end.

Threadedly mounted on the elevator screw 123 within, and having facewise abutting engagement with the bottom wall 118 of, the shell 117, is an elevating bevel gear 127 having meshing engagement with a beveled driving gear 128 keyed to the inner end of an operating shaft 129 rotatively mounted in and extending through the tubular shaft or quill 122 and through an auxiliary hanger bearing 130 mounted rigidly on the frame 61.

At its outwardly extending end, the operating shaft 129 is provided with a conventional crank handle 131, all as best seen in Figure 6 and for purposes presently more fully appearing.

Fixed at its ends upon, and extending transversely between, the side beams 4 of the machine bed 1, is an intermediate cross beam 132 centrally provided with a vertical journal box or bearing 133 rotatively receiving a shaft 134 provided on its upper end with an eccentric crank 135 having a counter-balancing weight 136 and a diametrically opposed upwardly extending crank pin 137 for rotative engagement in a conventional downwardly presented step bearing 138 welded or otherwise fixed upon the under face of the frame center beam 62.

On its downwardly extending end, the shaft 134 is provided with a large pulley wheel 139 drivingly connected by a belt 140 to a driving pulley 141 of an electric motor or other prime mover 142 mounted upon the side beam 5 of the machine bed 1 and conventionally connected by means of an electrical conductor 143 to a conventional controller 144 connected by an electrical conductor 145 to any suitable source of electrical current supply (not shown).

Provided for shiftable disposition over the graining pan or tray 68, is a plurality of clamp bars 146 each preferably of L-section angle iron having a vertical leg 147 and a horizontal flange 148. At its extremities, each leg 147 is cut away in the provision of a slot 149 and provided with an enlarged vertically bored internally threaded lug 150 for receiving a clamp screw 151. The slots 149 of the clamp bars 146 are disposed embracingly around the side wall flanges 74 of the graining pan or tray 68 and releasably held in position by clamp screws 151, all as best seen in Figure 11 and for purposes presently more fully appearing.

Each of the clamp bars 146 is shiftably provided with a plurality of work clamps 152, each comprising a body block 153 having a horizontal slot 154 sized for slidably embracing the horizontal flange 148 of a clamp bar 146. Each body block 153 on its under face is provided with a preferably integral downwardly extending bracket member 155 having a horizontal leg 156, the body block 153 and the horizontal leg 156 being co-axially bored for freely receiving a threaded clamp screw 157 provided at its upper end with a handle grip 158 and at its lower end with a rotatable clamping foot 159. Threadedly mounted on the clamp screw 157 and held between the opposed faces of the body block 153 and the horizontal leg 156, is an internally threaded nut 160, all as best seen in Figures 11 and 12 and for purposes presently more fully appearing.

In use and practice, the graining tray bottom 69 is covered with a rubber sheet to prevent excessive wear and the zinc plates or other work to be grained are placed flatwise thereupon. Depending upon the area and shape of the work, it may be possible to place a number of plates in the graining tray for simultaneous treatment by fitting them in substantially edgewise abutment. The bars 146 are then shifted into more or less registration with the transverse margins of the work and clamped in place against the flanges 74 by means of the screws 151. The work clamps 152 are then shifted over the margins of the work and screwed down tightly thereon, so that the work will be securely held upon the bottom of the graining tray or pan 68.

The hopper 83, which is initially filled with a substantial quantity of steel grinding balls, is tilted about the shaft 82 from the position shown in Figure 8 to the position shown in Figure 7 by starting the motor 108, which rotates the bevel gear 104, in turn, rotating the bevel gear 96 and the lead screw 95. The block 97 is progressed rearwardly by rotation of the lead screw 95, thus moving the link members 100 rearwardly and upwardly and thereby tilting the hopper 83 and allowing the steel balls to roll outwardly over the work. It will, of course, be evident that a sufficient quantity of balls should be placed in the hopper 83 to completely cover the entire bottom 69 of the graining tray or pan 68. A quantity of carborundum powder or other abrasive material is scattered over the balls and a limited quantity of water poured into the graining pan 68 to serve as a grinding vehicle. The motor 142 is then energized, rotarily driving the pulley wheel 139, which, in turn, rotates the eccentric crank 135 through the shaft 134. The rotary motion of the crank is transmitted through the crank pin 137 to the frame 61, imparting a rotarily oscillating or circumnutatory movement, which is permitted to rock freely upon the hanger rods 23 to effect a graining or grinding of the exposed surface of the zinc plate or other work in the machine A. Depending upon the character and nature of the work, it may be necessary to continue this reciprocatory movement for a shorter or longer period of time, as the case may be.

When the graining operation has been completed, the motor 142 is stopped and the cam locks 78 of the graining table are momentarily released, permitting the slidable rear wall 79 to be shifted vertically upwardly. The hopper 83 is returned to its initial upright position, as shown in Figure 8, and the flap door 90 thereof is swung backwardly, opening the slot 88. The elevator crank 131 is thereupon rotated, driving the elevator screw 123 upwardly for lifting the forward end of the graining table 68 and tilting the latter, so that it is inclined rearwardly. The grinding balls, carborundum powder, and water will thereupon run freely downwardly through the hopper slot 88 into the hopper 83. If desired, the motor 142 may again be set in rotation to swing or rotarily oscillate the graining table 68 for accelerating the removal of the balls. As the balls fall into the hopper 83, the water will drain therefrom through the mesh-like bottom 86 of the hopper 83. Following removal of the balls, the zinc plates or other work may be sluiced down with a stream of water and the graining table 68 then returned to horizontal position, after which the clamps 152 may be released and the finished work removed.

By reason of the fact that the frame 61 is supported from the adjustable rods 23, it may be leveled quickly and conveniently and maintained in accurate adjustment. Furthermore, since the housings 11 are sealed by the sealing cups 27 and cap plates 35, carborundum dust and other grit are kept away from the bearing surfaces, thus maintaining their efficiency and prolonging their usefulness.

It should be understood that changes and modifications in the form, construction, arrangement, and combination of the several parts of the graining machine may be made and substituted for those herein shown and described without departing from the nature and principle of our invention.

Having thus described our invention, what we claim and desire to secure by Letters Patent is—

1. A graining machine including a bed, a plurality of uprights mounted on the bed having inwardly offset arms each provided with a swingably depending hanger member, and work-supporting means operatively suspended from the hanger members for substantially horizontal oscillation.

2. A graining machine including a bed, a plurality of uprights mounted on the bed having inwardly offset arms each provided with a swingably depending hanger member, a frame operatively suspended for oscillation, and a work-supporting tray tiltably mounted on the frame.

3. A graining machine including a bed, a plurality of uprights mounted on the bed having inwardly offset arms each provided with a swingably depending hanger member, a frame operatively suspended for oscillation, a work-supporting tray tiltably mounted on the frame, and a swingable hopper mounted on, and bodily movable with, the tray.

4. A graining machine including a bed, a plurality of uprights mounted on the bed having inwardly offset arms each provided with a swingably depending hanger member, a frame operatively suspended for oscillation, a work-supporting tray tiltably mounted on the frame, manually operable elevating means for tilting said tray, and means mounted on the frame for securely holding the tray against shifting movement relatively to the frame during oscillation.

5. A graining machine including a bed, a plurality of uprights mounted on the bed having inwardly offset arms each provided with a swingably depending hanger member, a frame operatively suspended for oscillation, a work-supporting tray tiltably mounted on the frame, a hopper operatively mounted on the tray, and means on the frame operatively connected with the hopper for producing movement thereof.

6. In a graining machine including an oscillatory frame and a work-supporting tray mounted thereon, a hopper pivotally mounted on the tray, driving means on the frame, and a pair of parallel links pivotally mounted at one end on the hopper and at the other end operatively connected with the driving means for producing swinging movement thereof.

7. In a graining machine including a frame and a work-supporting tray mounted thereon, a hopper pivotally mounted on the tray, a pair of links operatively mounted at one end on the hopper and at the other end provided with a nut, driving means mounted on the frame, and a lead screw threadedly engaged in the nut and operatively connected with the driving means.

8. In a machine of the character described, a swing hanger assembly comprising a fixed support having a downwardly presented housing, a swinging support having an upwardly presented housing, and a hanger link rotatively mounted at its opposite ends respectively in said housings.

9. In a machine of the character described, a swing hanger assembly comprising a fixed support having a downwardly presented housing, a swinging support having an upwardly presented housing, a hanger link rotatively mounted at its opposite ends respectively in said housings, and means for adjustably shifting said housings longitudinally of said link.

10. In a machine of the character described, a swing hanger assembly comprising a fixed support having a downwardly presented housing, a swinging support having an upwardly presented housing, a hanger link rotatively mounted at its opposite ends respectively in said housings, means for adjustably shifting said housings longitudinally of said link, and cup-like closure members mounted on said link and resiliently urged toward the housings.

11. In a machine of the character described, a dirt and grit-proof swing hanger assembly including a fixed support having a downwardly presented housing, a swinging support having an upwardly presented housing, a hanger link rotatively mounted at its opposite ends respectively in said housings, and spring-pressed sealing caps shiftably mounted on the links for slidable engagement with the housings.

12. In a machine of the character described, a swing hanger assembly including a fixed support having a housing provided with a downwardly presented aperture, a swinging support having a housing provided with an upwardly presented aperture, an annular fixed bearing member mounted in registration with the aperture in each of said housings, an oscillatory bearing member operatively mounted in each of the fixed bearings, and a hanger link mounted at its opposite ends respectively in said oscillatory bearing members.

13. In a graining machine, a swing hanger comprising a pair of cylindrical housings having inwardly extending annular flanges, an annular ball race mounted upon each of the flanges, a ring-retained series of ball bearings mounted upon each of the races, a convex centrally apertured disk rotatively and shiftably mounted upon the ball bearings in spaced relation to the race, and a connecting rod mounted at its opposite ends in, and extending longitudinally between, the disks.

14. In a graining machine, a swing hanger comprising a pair of cylindrical housings having inwardly extending annular flanges, an annular ball race mounted upon each of the flanges, a ring-retained series of ball bearings mounted upon each of the races, a convex centrally apertured disk rotatively and shiftably mounted upon the ball bearings in spaced relation to the race, and a connecting rod adjustably mounted at its opposite ends in, and extending longitudinally between, the disks.

15. In a graining machine, a swing hanger comprising a pair of cylindrical housings having integrally formed inwardly extending annular flanges, an annular ball race mounted upon each of the flanges, a ring-retained series of ball bearings mounted upon each of the races, a convex centrally apertured disk rotatively and shiftably mounted upon the ball bearings in spaced relation to the race, a connecting rod mounted at its opposite ends in, and extending longitudinally between, the disks, and sealing cups shiftably mounted on the rod adjacent each of the housings for rotatable and slidable engagement with the outer face of the housing flange.

16. In a graining machine having a tiltable table provided at its one end with a discharge opening, in combination, a hopper tiltably mounted on the table and having a bottom wall normally disposed in closurewise relation across the discharge end of the table and being provided with an inwardly swinging door-like section for permitting the contents of the table to discharge into the hopper when the table is tilted.

17. In a graining machine, a horizontal oscillatory frame provided at one end with a housing mounted for rockable movement about a horizontal axis and at its other end with pivot bearings, a trough-like graining tray mounted in the pivot bearings for swingable movement about an axis parallel to the axis of the rockable housing, screw means mounted at one end upon the tray and extending shiftably through the rockable housing, and means in the housing for driving the screw in and out of the housing for elevating and lowering the tray with respect to the frame.

18. In a graining machine, an oscillatory frame, a trough-like graining tray tiltably mounted on the frame, a hopper pivotally mounted on the tray, driving means mounted on the frame, and longitudinally shiftable means rockably connected at its opposite ends to the hopper and driving means respectively for tilting the hopper with respect to the tray upon actuation of the driving means and permitting the tray and hopper to be tilted together without producing relative movement therebetween when the driving means is inactive.

EDWIN P. MERTES.
JESSE J. KELLOGG.
EDWARD E. FICKENWIRTH.